United States Patent [19]

Genov et al.

[11] Patent Number: 5,064,340

[45] Date of Patent: Nov. 12, 1991

[54] PRECISION ARM MECHANISM

[75] Inventors: Genco Genov; Lubomir Skrobak, both of Sunnyvale; Izya Kremerman, San Francisco; Grzegorz Kielczewski, San Bruno, all of Calif.

[73] Assignee: Genmark Automation, Sunnyvale, Calif.

[21] Appl. No.: 299,754

[22] Filed: Jan. 23, 1989

[51] Int. Cl.$^5$ ............................................. B25J 18/00
[52] U.S. Cl. .................................. 414/744.5; 414/751
[58] Field of Search ................. 414/744.5, 744.6, 749, 414/451, 752, 753; 901/21, 15; 74/469, 89.22

[56] References Cited

U.S. PATENT DOCUMENTS

| | | | |
|---|---|---|---|
| 3,363,474 | 1/1968 | Ritter et al. | 74/52 |
| 3,401,568 | 9/1968 | Blatt | 74/37 |
| 3,561,614 | 2/1971 | Tezuka | 414/751 |
| 3,920,972 | 11/1975 | Dudley et al. | 235/151.11 |
| 4,196,049 | 4/1980 | Burns et al. | 176/19 R |
| 4,299,533 | 11/1981 | Ohnaka | 414/752 |
| 4,531,885 | 7/1985 | Molaug | 414/735 |
| 4,537,084 | 8/1985 | Passemard et al. | 74/89.22 |
| 4,600,355 | 7/1986 | Johnson | 901/21 X |
| 4,630,992 | 12/1986 | Gilli et al. | 901/17 X |
| 4,666,366 | 5/1987 | Davis | 901/25 X |
| 4,921,395 | 5/1990 | Sahlin | 414/744.3 |

FOREIGN PATENT DOCUMENTS

| | | | |
|---|---|---|---|
| 1108668 | 9/1981 | Canada | 901/21 X |
| 1206077 | 1/1986 | U.S.S.R. | 414/751 X |
| 2193482 | 2/1988 | United Kingdom | |

OTHER PUBLICATIONS

"Orbitran Wafer Handling Robot", Genmark Automation; 6-5-89, pp. 2,3,4, Product #6100.
Photograph of DSW Wafer Stripper.

Primary Examiner—David A. Bucci
Assistant Examiner—Donald W. Underwood
Attorney, Agent, or Firm—Fliesler, Dubb, Meyer & Lovejoy

[57] ABSTRACT

An arm structure includes either two or three links pivotally connected to one another with a hand or end effector at the distal end of the distal link. Straight line movement of the pivoting mounting place of the end effector is provided from a rotating drive wheel coaxial with the pivoting of the proximal end of the proximal link. A drive wheel coaxially with the pivot of the proximal end of the proximal link causes the first and second links to pivot about their pivot axis. This pivoting causes the first link to pivot about its proximal end and causes the end effector to pivot in the two link version and causes the second and third links to pivot about their pivot axis in the three link version. A housing can be present intermediate the ends of the first link to provide a gearing adjustment. Generally, θ and Z motors also are present. The arm structure is useful for moving wafers, hard computer discs, and the like for processing, loading, unloading, etc.

32 Claims, 6 Drawing Sheets

PRECISION ARM MECHANISM

TECHNICAL FIELD

The present invention relates to a precision arm mechanism which will extend and retract in a straight line and is suitable for positioning various objects such as semiconductor wafers, computer hard discs, and the like for processing and/or use.

BACKGROUND OF THE INVENTION

The use of robot arms for positioning and placing objects is well known. Generally, the arms have Z, r and $\theta$ motion in a conventional cylindrical coordinate system. The r or straight line movement of the end effector or mechanical hand at the end of the arm has been accomplished in a number of manners. For example, telescoping arms have been utilized for this purpose. However, these can cause a problem in generating particles which can interfere with processing of articles such as semiconductor wafers.

United Kingdom Patent Application GB 2193482A, published Feb. 10, 1988 and claiming priority from U.S. patent application Ser. No. 856,749 filed Aug. 5, 1986 discloses a wafer handling arm which includes two unequal length links with the distal end of one link being pivotally attached to the proximal end of the other link, with the hand being integral with the distal end of the distal link and which utilizes a belt drive which is fixed to a cam to attain nearly straight line motion. The accuracy of the motion is inherently sensitive to the cam shape and placement. Also, the pivots are exposed whereby particles can be produced at the pivots and at the cam.

It is also known to utilize an isosceles triangle type linkage wherein two equal length links are pivoted together and a mechanical hand is pivoted to the distal end of the distal link. Pulleys and belts are utilized in such a manner that the angle between the two links changes at twice the rate as do the angles that each of the links makes with a line connecting the points about which their other ends are pivoted. This linkage provides drive directly from a motor shaft to the proximal end portion of the proximal link. A belt about a stationary pulley coaxial with the motor shaft passes about a pulley at the point of pivoting of the two links to one another. Another pulley and belt arrangement provides pivoting of another pulley where the second link is pivotally connected to the mechanical hand. There are certain disadvantages in such a system. First, the transmission of force from the motor via pivoting of the first link to the pivot which controls the mechanical hand is through the intermediate pivot where rigidity is not present and the length of transmission is sufficiently far so that the positioning of the hand is not nearly so accurate as would be desirable. Next, any chattering or cogging of the motor is transmitted directly or even multiplied at each of the pulleys and thereby at each of the pivot points of the apparatus.

In another apparatus a pair of isoceles triangle type linkages face one another and the mechanical hand is pivotally attached to the distal ends of both of the distal links. The proximal ends of each of the proximal links is driven in an opposite direction of rotation by a single rotating motor shaft, generally through use of appropriate gearing. What results is a frogs leg type of motion with each isoceles triangle type linkage serving as means for controlling the other such linkage in such a manner that the angles between the two links of each of the isosceles triangle linkages changes at twice the rate as do the angles that each of the links makes with a line connecting the points about which their other ends are pivoted. Exposed metal gears can lead to particle formation. And, like the previously discussed isosceles triangle type linkage, the drive is at the proximal end of the proximal links. As a result, the mechanical hand, due to weight considerations, slack in pivots, etc., cannot be as accurately placed as would be desirable. Also, any chattering or cogging of the motor is transmitted directly via the gearing to the proximal end portions of the proximal links.

The present invention is directed to overcoming one or more of the problems as set forth above.

DISCLOSURE OF THE INVENTION

In accordance with an embodiment of the present invention an arm structure is set forth. The arm structure comprises a first longitudinally extending link having proximal and distal end portions. A second longitudinally extending link is provided which is equal in effective length to the first link, the second link also having proximal and distal end portions. A first housing is mounted in perpendicular relation to the first link intermediate its proximal and distal end portions for rotation about an axis perpendicular to the first link. The first housing has first and second pulley surfaces coaxially on it and longitudinally spaced from one another. A relatively static structure is provided with the first link being rotatably mounted to the relatively static structure about an axis of rotation parallel to that of the first housing. The relatively static structure has a first cylindrical surface having an axis of rotation parallel to that of the first housing. A drive wheel is provided which is coaxial with the first cylindrical surface and which is aligned opposite the first pulley surface. A post is mounted to the distal end portion of the first link parallel to the first housing and having a second cylindrical surface on it having an axis parallel to that of the first housing. A second housing is rotatably mounted to the post and has an axis of rotation parallel to that of the first housing. The second housing has a third pulley surface aligned opposite the first cylindrical surface and has a fourth pulley surface aligned opposite the second pulley surface. A third housing is rotatably mounted to the distal end portion of the second link. The third housing has an axis of rotation parallel to that of the first housing and has a fifth pulley surface aligned opposite the second cylindrical surface. An end effector is attached to the third housing and extends at a selected angle to a line which passes through and is perpendicular to the axis of the first cylindrical surface and the axis of the third housing. First rotating means serves for applying a rotational force between the drive wheel and the first pulley surface. Second rotating means serves for applying a rotational force between the second pulley surface and the fourth pulley surface. Third rotating means serves for applying a rotational force between the third pulley surface and the first cylindrical surface. The first cylindrical surface has a circumferential extension twice that of the third pulley surface. Fourth rotating means serves for applying a rotational force between the second cylindrical surface and the fifth pulley surface. The fifth pulley surface has a circumferential extension twice that of the second cylindrical surface.

In accordance with another embodiment of the present invention an alternative arm structure is set forth. The alternative arm structure comprises a first longitudinally extending link having proximal and distal end portions. A second longitudinally extending link is provided also having a proximal end portion and a distal end portion. The second link is twice the effective length of the first link. A third longitudinally extending link is provided which is equal in effective length to the first link. The third link also has proximal and distal end portions. A first housing is mounted to the first link intermediate its proximal and distal end portions. The first housing is mounted for rotation about an axis perpendicular to the first link. The first housing has first and second pulley surfaces coaxially thereon and spaced longitudinally from one another. A relatively static structure is provided having a first cylindrical surface having an axis parallel to that of the first housing. The relatively static structure is located at the proximal end portion of the first link. The first link is rotatably mounted to the relatively static structure for rotation about an axis of rotation parallel to that of the first housing. A drive wheel is coaxial with the first cylindrical surface and is aligned opposite the first pulley surface. A first post is mounted to the distal end portion of the first link parallel to the first housing and has a second cylindrical surface on it having an axis parallel to the first housing. A second housing is rotatably mounted to the first post and has an axis of rotation parallel to that of the first housing. The second housing has a third pulley surface aligned opposite the first cylindrical surface and has a fourth pulley surface aligned opposite the second pulley surface. A second post is mounted to the distal end portion of the second link parallel to the first housing and has a third cylindrical surface on it having an axis parallel to that of the first housing. A third post is mounted to the distal end portion of the third link parallel to the first housing and has a fourth cylindrical surface on it having an axis parallel to that of the first housing. A third housing is rotatably mounted to the third post and has an axis of rotation parallel to that of the first housing and has a fifth pulley surface aligned opposite the third cylindrical surface. A fourth housing is rotatably mounted to the second post and has an axis of rotation parallel to that of the first housing and has a sixth pulley surface aligned opposite the second cylindrical surface. An end effector is attached to the third housing and extends at a selected angle to a line which passes through and is perpendicular to the axis of the first cylindrical surface and the axis of the third housing. First rotating means serves for applying a rotational force between the drive wheel and the first pulley surface. Second rotating means serves for applying a rotational force between the second pulley surface and the fourth pulley surface. Third rotating means serves for applying a rotational force between the third pulley surface and the first cylindrical surface. The first cylindrical surface has a circumferential extension twice that of the third pulley surface. Fourth rotating means is provided for applying a rotational force between the second cylindrical surface and the sixth pulley surface. The second cylindrical surface and the sixth pulley surface have equal circumferential extensions. Fifth rotating means serves for applying a rotational force between the third cylindrical surface and the fifth pulley surface. The fifth pulley surface has a circumferential extension twice that of the third pulley surface.

In accordance with still another embodiment of the present invention an arm structure is set forth comprising first and second longitudinally extending links each having proximal and distal end portions. The second longitudinally extending link is twice the effective length of the first link and the proximal end portion of the second link is pivotally mounted to the distal end portion of the first link about a first pivot axis. A third longitudinally extending link is equal in effective length to the first link, the third link having proximal and distal end portions. The proximal end portion of the third link is rotatably mounted about a third pivot axis to the distal end portion of the second link. An end effector is pivotally mounted to the distal end portion of the third link for rotation about a fourth pivot axis. Means is provided for coordinately rotating the first link, the second link, the third link and the end effector at a rotation ratio of the first axis to the second axis to the third axis to the fourth axis of 1:2:2:1.

In accordance with yet another embodiment of the present invention an arm structure is set forth comprising first and second longitudinally extending links having proximal and distal end portions. The second longitudinally extending link is equal in effective length to the first link. A relatively static structure is located at the proximal end portion of said first link. First pivot means serves for mounting the proximal end portion of the first link to the relatively static structure for rotation about a first pivot axis. Second pivot means serves for mounting the proximal end portion of the second link to the distal end portion of the first link for rotation about a second pivot axis parallel to the first pivot axis. An end effector is pivotally mounted by third pivot means to the distal end portion of the second link for rotation about a third pivot axis parallel to the first pivot axis. Drive means is present for applying a rotational force to rotate the links about the second pivot axis. First pivot axis rotating means serves for applying a rotational force from the second pivot axis to the first pivot axis to rotate the first link about the first pivot axis. Third pivot axis rotating means serves for applying a rotational force from the second pivot axis to the third pivot axis to rotate the end effector about the third pivot axis. The rotating means includes coordinating means for coordinating the pivoting of the first link about said first pivot axis, the second link about the second pivot axis and the end effector about the third pivot axis at relative rotation ratios of 1:2:1 such that the third axis moves linearly along a line passing through and perpendicular to the first pivot axis and to the third pivot axis and the end effector is maintained at a selected angle to the line.

Another embodiment yet of the present invention is an arm structure comprising a first longitudinally extending link having a proximal end portion and a distal end portion, a second longitudinally extending link having a proximal end portion and a distal end portion, the second link having twice the effective length of the first link, a third longitudinally extending link equal in effective length to the first link, the third link having a proximal end portion and a distal end portion and an end effector A relatively static structure is located at the proximal end portion of the first link. First pivot means serves for mounting the proximal end portion of the first link to the relatively static structure for rotation about a first pivot axis. Second pivot means serves for mounting the proximal end portion of the second link to the distal end portion of the first link for rotation about a second pivot axis parallel to the first pivot axis. Third pivot means serves for mounting the end effector to the distal end portion of the third link for rotation about a third pivot axis parallel to the first pivot axis. Fourth pivot means serves for mounting the proximal end portion of the third link to the distal end portion of the second link for rotation about a fourth axis parallel to the first pivot axis. Drive means serves for applying a rotational force to rotate the first and second links about the second pivot axis. First pivot axis rotating means serves for applying a rotational force from the second pivot axis to the first pivot axis to rotate the first link about the first pivot axis. Fourth pivot axis rotating means serves for applying a rotational force from the second pivot axis to the fourth pivot axis to rotate the second and third links about the fourth pivot axis. Third pivot axis rotating means serves for applying a rotational force from the fourth pivot axis to the third pivot axis to rotate the end effector about the third pivot axis. The rotating means include coordinating means for coordinating the pivoting of the first link about the first pivot axis, the second link about the second pivot axis, the third link about the fourth pivot axis and the end effector about the third pivot axis at relative rotation ratios of 1:2:2:1 such that the third axis moves linearly along a line passing through and perpendicular to the first pivot axis and to the third pivot axis and the end effector is maintained at a selected angle to the line.

Arm structures in accordance with the present invention have a number of advantages over prior art structures. In those embodiments which specifically require a first housing the first housing serves two purposes. First, it ensures that the driving force for the first and second links is provided at the pivotal intersection of these two links. Thus, the total length of transmission through the belts to the end effector is minimized and the transmission does not pass through any pivots in the two link version and only through a single pivot in the three link version. Second the first housing serves to greatly reduce any cogging or chattering of the motor since it takes a number of turns of the drive wheel to cause a single turn of the second housing from which drive is provided to both the first link and the second link. Such structural improvements allow much more accurate placement of the end effector. Such accurate placement is also provided if the first housing is omitted so long as the drive wheel drives rotation of the first and second links relative to one another and rotation of the first link about its proximal end portion is caused by rotation of the first and second links about their pivot axis. With respect to the embodiments which utilize three links and an end effector an additional important advantage is realized. This advantage is that the lateral extension of the arm structure is significantly reduced whereby the arms can be placed in a position with a limited lateral space.

BRIEF DESCRIPTION OF DRAWINGS

The invention will be better understood by reference to the figures of the drawings wherein like numbers denote like parts throughout and wherein.

BEST MODE FOR CARRYING OUT THE INVENTION

Figure 1:
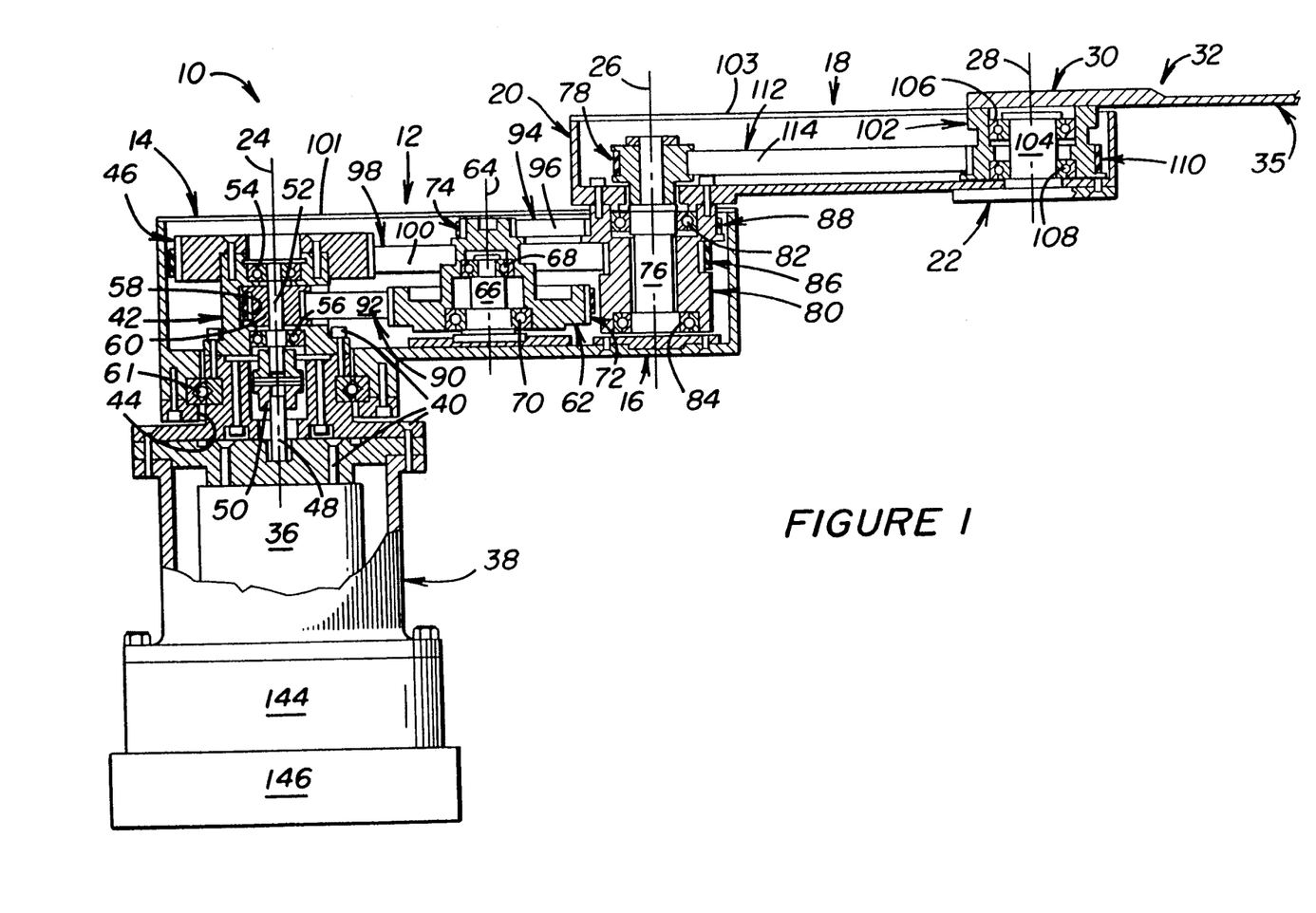
FIG. 1 illustrates, in sectioned elevational view, partially schematically, an arm structure in accordance with an embodiment of the present invention.
Figure 2:
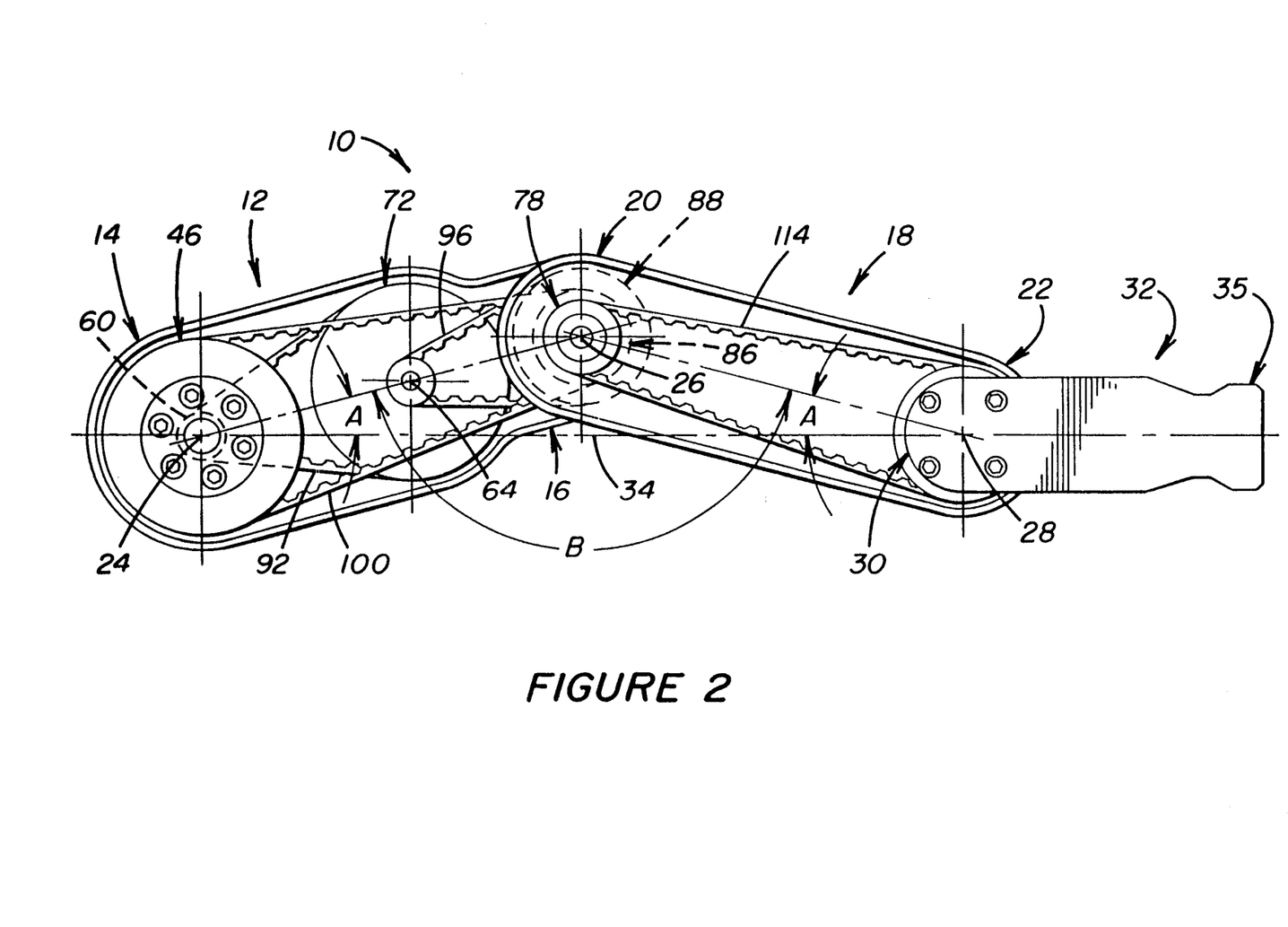
FIG. 2 is a top view of the embodiment of FIG. 1 with the coverings of the links omitted to show the interior.
Figure 3:
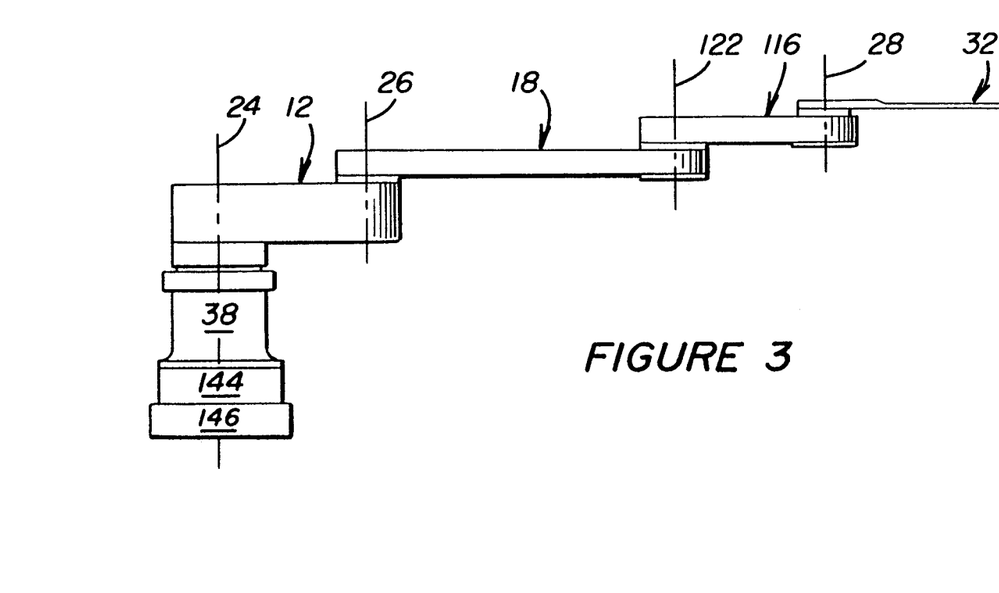
FIGS. 3, 3A and 3B show an alternate embodiment of the present invention with FIG. 3 being reduced in size to show the entire structure and with FIGS. 3A and 3B together constituting a view similar to FIG. 1.
Figure 3A:
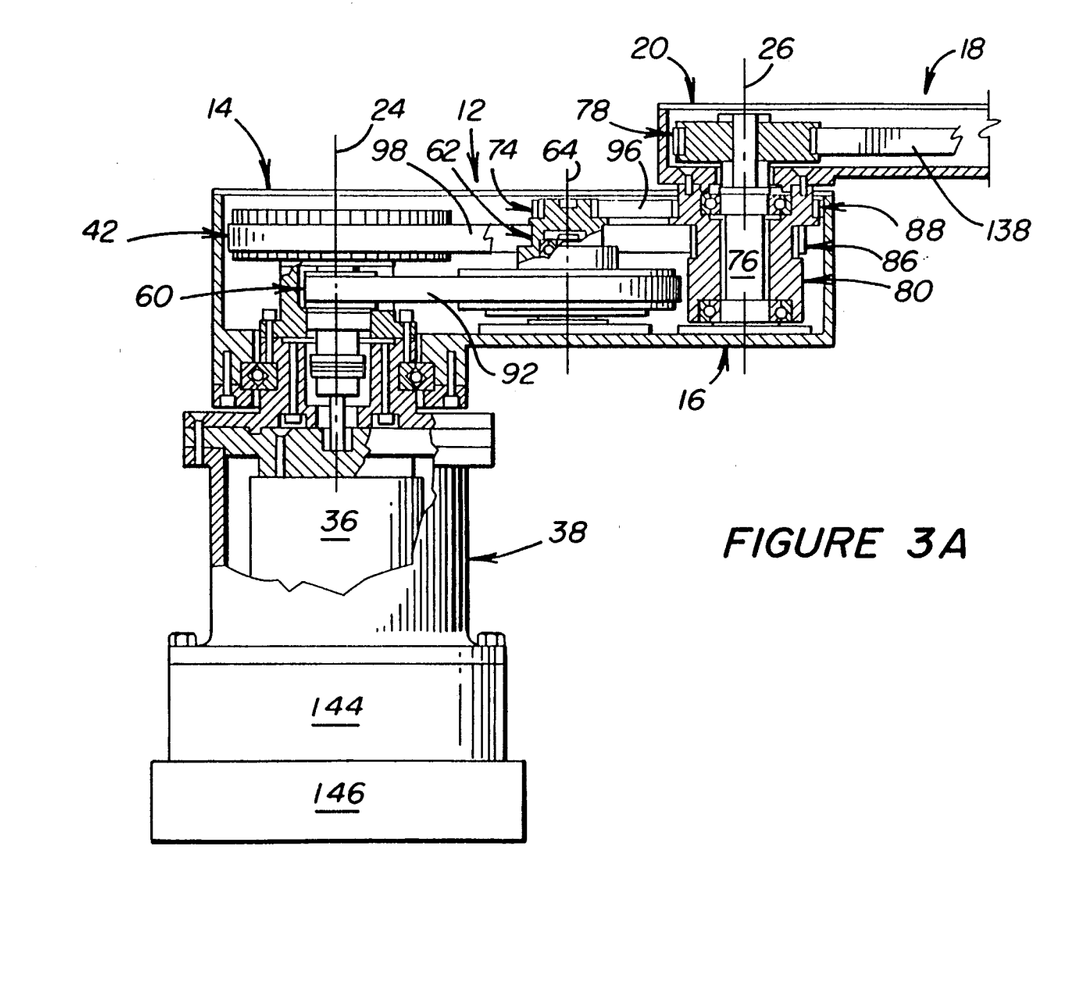
Figure 3B:
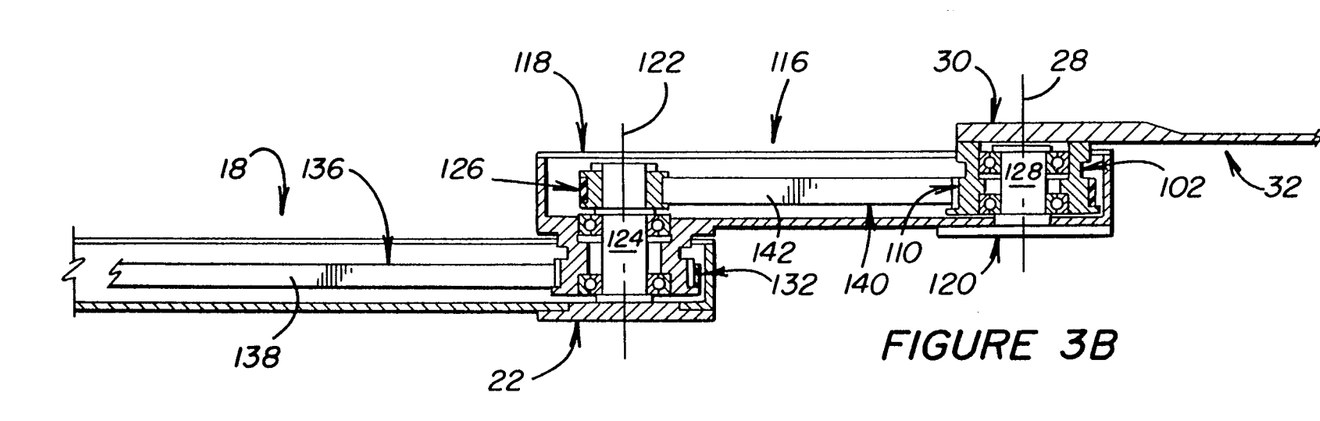

FIGS. 1 and 2 illustrate one aspect of an embodiment in accordance with the present invention. In each of these figures an arm structure 10 is shown which includes both a first longitudinally extending link 12 having a proximal end portion 14 and a distal end portion 16 and a second longitudinally extending link 18 which is equal in effective length to the first link 12, with the second link 18 also having a proximal end portion 20 and a distal end portion 22. The term effective length is used to indicate that the distance between a first pivot axis 24 where the proximal end 14 of the first link 12 is pivotally mounted as will be explained later, and a second pivot axis 26 where the proximal end portion 20 of the second link 18 is pivotally mounted to the distal end portion 16 of the first link 18, is equal to the distance between the second pivot axis 26 and a third pivot axis 28 where a proximal end portion 30 of a mechanical arm or end effector 32 is pivotally mounted to the distal end 22 of the second link 18. This, along with the requirement as will be discussed later that angular rotation about the second axis 26 be twice that about each of the first axis 24 and the second axis 28, assures that the end effector 32 moves at a selected angle to a line 34 which passes through the first pivot axis 24 and the third pivot axis 28 and is perpendicular to both of these axes. A distal end portion 35 of the end effector 32 will have means for grasping a workpiece (not shown) such as a silicon wafer or a computer hard disc.

The terms proximal and distal as used herein are relative to the first pivot axis 24. The terms cylindrical surface and pulley surface as used herein are used to distinguish from those surfaces which are on non-pivoting members (the cylindrical surfaces) and those surfaces which are on pivoting members (the pulley surfaces).

A motor 36 is mounted to a relatively static structure 38 via conventional bolts 40. The static structure 38 includes a part 42 which extends upwardly through an opening 44 in the first link 12. The upwardly extending part 42 of the static structure 38 has a first cylindrical surface 46 the use of which will shortly become apparent. A shaft 48 extends upwardly from the motor 36 and may be extended, as illustrated, by using a coupling 50 to attach an extension shaft 52 to the shaft 48. The extension shaft 52 is rotatably mounted at spaced apart bearings 54 and 56 to an interior cavity 58 in the upper portion 42 of the relatively static structure 38. A drive wheel 60 is mounted to the extension shaft 52 and rotates therewith. As will be noted the drive wheel 60 is coaxial with the first cylindrical surface 46. The first link 12 is pivotally mounted to the relatively static structure 38 at a bearing 61.

In accordance with this embodiment of the present invention a first housing 62, which can be of multi-part construction as illustrated, is mounted in perpendicular relation to the first link 12 and in parallel relation to the first pivot axis 24, the second pivot axis 26 and the third pivot axis 28 intermediate the proximal end portion 14 and the distal end portion 16 of the first link 12. The first housing 62 is mounted for rotation about the axis 64 by its being mounted to an upstanding member 66 which also has the axis 64 via appropriate spaced apart bearings 68 and 70, as illustrated. The first housing 62 has a first pulley surface 72 and a second pulley surface 74 coaxially on it. The first and second pulley surfaces 72 and 74 are longitudinally spaced from one another along the first housing 62. The first pulley surface 72 is aligned opposite the drive wheel 60, as illustrated.

A post 76 is mounted to the distal end portion 16 of the first link 12 along the second pivot axis 26. The post 76 has a second cylindrical surface 78 on it with the second cylindrical surface 78 being cylindrical about the second pivot axis 26. A second housing 80 is rotatably mounted to the post 76 via the spaced apart bearings 82 and 84 whereby the second housing 80 is rotatable about the second pivot axis 26. The second housing 80 has a third pulley surface 86 aligned opposite the first cylindrical surface 46 and has a fourth pulley surface 88 aligned opposite the second pulley surface 74.

First rotating means 90, as illustrated a first belt 92, serves for applying a rotational force between the drive wheel 60 and the first pulley surface 72. Thus, the first housing 62 is rotated in response to rotation of the drive wheel 60 which is driven by the motor 36. The circumference of the first pulley surface 72 is significantly greater than that of the drive wheel 60, thus providing a reduction of the rate of rotation of the first housing 62 as compared to that of the motor 36. Thus, this provides a first stage of reduction of any jerkiness in, chattering or cogging of the motor 36.

Second rotating means 94, in the embodiment illustrated a second belt 96, serves for applying a rotational force between the second pulley surface 74 and the fourth pulley surface 88 on the second housing 80. The second pulley surface 74 suitably has a smaller circumference, as illustrated, than does the fourth pulley surface 88, whereby a further reduction is provided to reduce the effect of any chattering or cogging in the motor 36.

Third rotating means 98, in the embodiment illustrated a third belt 100, serves for applying a rotational force between the third pulley surface 86 on the second housing 80 and the first cylindrical surface 46. Since the first cylindrical surface 46 is part of the relatively static structure 38 the rotational force applied by the belt 100 results in rotation of the first link 12 about the first pivot axis 24 (at bearing 61). The first cylindrical surface 46 must have a circumferential extension twice that of the third pulley surface 86. This provides the needed 2:1 ratio of change of the angle B to the angle A for the embodiment of FIGS. 1 and 2. It also provides an additional reduction of the motor 36 to further reduce or eliminate any possible chattering or cogging problems. Note that the overall reduction of the linkages is not the simple product of the ratios of the circumferences of the pulleys due to the motion of the second pivot axis 26.

To control any possible problems with chattering and cogging it is suitable to have a reduction from the drive wheel 60 to the first cylindrical surface 46 of at least about 5 to 1, more preferably about 10 to 1. In the particular embodiment illustrated, the reduction is about 14.2 to 1.

It is important to note that driving of rotation of the first link 12 and the second link 18 about the second pivot axis 26 by the drive wheel 60, whether via use of the first housing 62 to transmit power from the drive wheel 60 as illustrated or directly, provides a great advantage in accuracy of placement of the end effector 32. Note that the rotation of the first link 12 about the first pivot axis 24 is motivated by rotation of the second housing 80 (with which the second link 18 rotates). Thus, the transmission of power is from the second pivot axis 26 to the first pivot axis 24, a distance equal in effective length to the effective length of the first link 12. A similar distance of transmission of power takes place from the second pivot axis 26 to the third pivot axis 28. In neither instance is the power transmitted through a pivot whereat full rigidity is not present. As a result a construction is provided whereby the end effector 32 can be very accurately controlled and is free from error in placement.

The various moving components i.e., the pivots and belts, can advantageously be enclosed in casings 101 and 103 whereby contamination by particulate debris is prevented.

Referring again to FIGS. 1 and 2 it will be noted that there is a third housing 102 rotatably mounted to the distal end portion 22 of the second link 18 and having as an axis of rotation the third pivot axis 28. The third housing 102 is mounted to a second post 104 which is attached to the distal end portion 22 of the second link 18. The mounting is via appropriate spaced apart bearings 106 and 108. The end effector 32, more particularly the proximal end 30 thereof, is attached to and rotates with the third housing 102. The third housing 102 has a fifth pulley surface 110 which is aligned opposite the second cylindrical surface 78 on the first post 76.

Fourth rotating means 112, in the embodiment illustrated a fourth belt 114, serves for applying a rotational force between the second cylindrical surface 78 and the fifth pulley surface 110. In accordance with the embodiment of FIGS. 1 and 2 the fifth pulley surface 110 has a circumferential extension twice that of the second cylindrical surface 78. In this manner it is assured that rotation about the third pivot axis 28 is one-half that about the second pivot axis 26 whereby the end effector 32 moves at a selected angle to the line 34 as the third pivot axis 28 moves along the line 34. In most instances the angle will be zero degrees and the end effector 32 will move along the line 34. Note that as the first link 12 swings this moves the second cylindrical surface 78 through an arc thereby providing force transmission via the fourth belt 114 to rotate the third housing 102 and with it the end effector 32. All motion is controlled by power delivered to the second housing 80 from the first housing 62 in the manner previously discussed. Thus, the end effector 32 can be very accurately positioned.

Operation should be recognized as being relatively straightforward. As the drive wheel 60 rotates the belt 92 transmits rotation to the first housing 62 which in turn, via the belt 96 causes the second housing 80 to rotate. Rotation of the second housing 80 leads to a force in the third belt 100 against the first cylindrical surface 46 which causes the first link 12 to rotate thus changing the angle A (since the first cylindrical surface 46 is relatively static). The change of angle A caused by the rotation of the first link 12 about the first pivot 24 changes the angular positioning between the drive wheel 60 and the first pulley surface 72. As a result the mechanical reduction is not equal to the simple multiple of the ratios of the circumferences of the pairs of pulleys contributing to the total mechanical reduction.

As the first post 76 is moved along with the distal end portion 16 of the first link 12, a force is exerted via the fourth belt 114 causing the third housing 102 to rotate along with the end effector 32. The sizes of the various pulleys and cylindrical surfaces are controlled so as to provide that both angles A remain equal and that angle B varies twice as much as each angle A. This provides a required straightline radial movement for the third pivot axis 28.

FIGS. 3, 3A, 3B and 4 illustrate an alternative embodiment of the present invention. The embodiment of FIGS. 3, 3A, 3B and 4 includes a first link 12, a second link 18 and a third link 116, with the third link 116 having a proximal end portion 118 and a distal end portion 120. The proximal end portion 14 of the first link 12 is rotatable about a first pivot axis 24, the distal end portion 16 of the first link 12 and the proximal end portion 20 of the second link 18 are pivotal about the second pivot axis 26 and the distal end 22 of the second link 18 and the proximal end 118 of the third link 116 are pivotal about a fourth pivot axis 122. The second end portion 120 of the third link 116 and the proximal end portion 30 of the end effector 32 are pivotal about a third pivot axis 28.

In accordance with the embodiment of FIGS. 3, 3A, 3B and 4 the first and third longitudinally extending links 12 and 116 are equal in effective length while the second longitudinally extending link 18 is twice the effective length of the first link 12 and of the third link 116. These lengths, in combination with the relative circumferences of various pulley and cylindrical surfaces as will be explained in following, lead to the required linear motion of the third pivot axis 28 and the retention of the end effector 32 at a selected angle to the line 34.

The first housing 62 serves substantially the same purpose as it does in the embodiment of FIGS. 1 and 2 and is similarly constructed and mounted. The relatively static structure 38 of FIGS. 3, 3A, 3B and 4 also serves the same purpose as does that of FIGS. 1 and 2. The same is true with respect to the drive wheel 60 and with respect to the first post 76. The second housing 80 of the embodiment of FIGS. 3, 3A, 3B and 4 likewise serves the same purpose as does the second housing 80 of FIGS. 1 and 2.

The embodiment of FIGS. 3, 3A, 3B and 4 includes a second post 124 mounted to the distal end portion 22 of the second link 18 parallel to the first housing 62. The second post 124 has a third cylindrical surface 126 on it about the fourth axis 122.

A fourth housing 132 is rotatably mounted to the second post 124 for rotation about the fourth axis 122. The fourth housing 132 has a sixth pulley surface 134 which is aligned opposite the second cylindrical surface 78.

The embodiment of FIGS. 3, 3A, 3B and 4 further includes a third post 128 mounted to the distal end portion 120 of the third link 116 with the third post 128 being along the third pivot axis 28.

A third housing 102 is rotatably mounted to the third post 128 for rotation about the third axis 28. The third housing 102 has a fifth pulley surface 110 which is aligned opposite the third cylindrical surface 126. The third housing 102 of FIGS. 3, 3A, 3B and 4 serves the same purpose as does the third housing 102 in FIGS. 1 and 2 in that the end effector 32 is attached to it and rotates with it.

First rotating means 90, second rotating means 94 and third rotating means 98 of the embodiment of FIGS. 3, 3A, 3B and 4 serve the same purposes as do the like numbered parts of FIGS. 1 and 2.

A fourth rotating means 136, in the embodiment a fourth belt 138, serves for applying a rotational force between the second cylindrical surface 78 and the sixth pulley surface 132. The second cylindrical surface 78 and the sixth pulley surface 132, in accordance with the embodiment of FIGS. 3, 3A, 3B and 4, have equal circumferential extensions. Thus, the rate of rotation about the second pivot axis 26 is equal to the rate about the fourth pivot axis 122.

The embodiment of FIGS. 3, 3A, 3B and 4 also includes a fifth rotating means 140, in the embodiment illustrated a fifth belt 142, which serves for applying a rotational force between the third cylindrical surface 126 and the fifth pulley surface 110. The fifth pulley surface 110, in accordance with the embodiment of FIGS. 3, 3A, 3B has a circumferential extension twice that of the third cylindrical surface 126.

Figure 4:
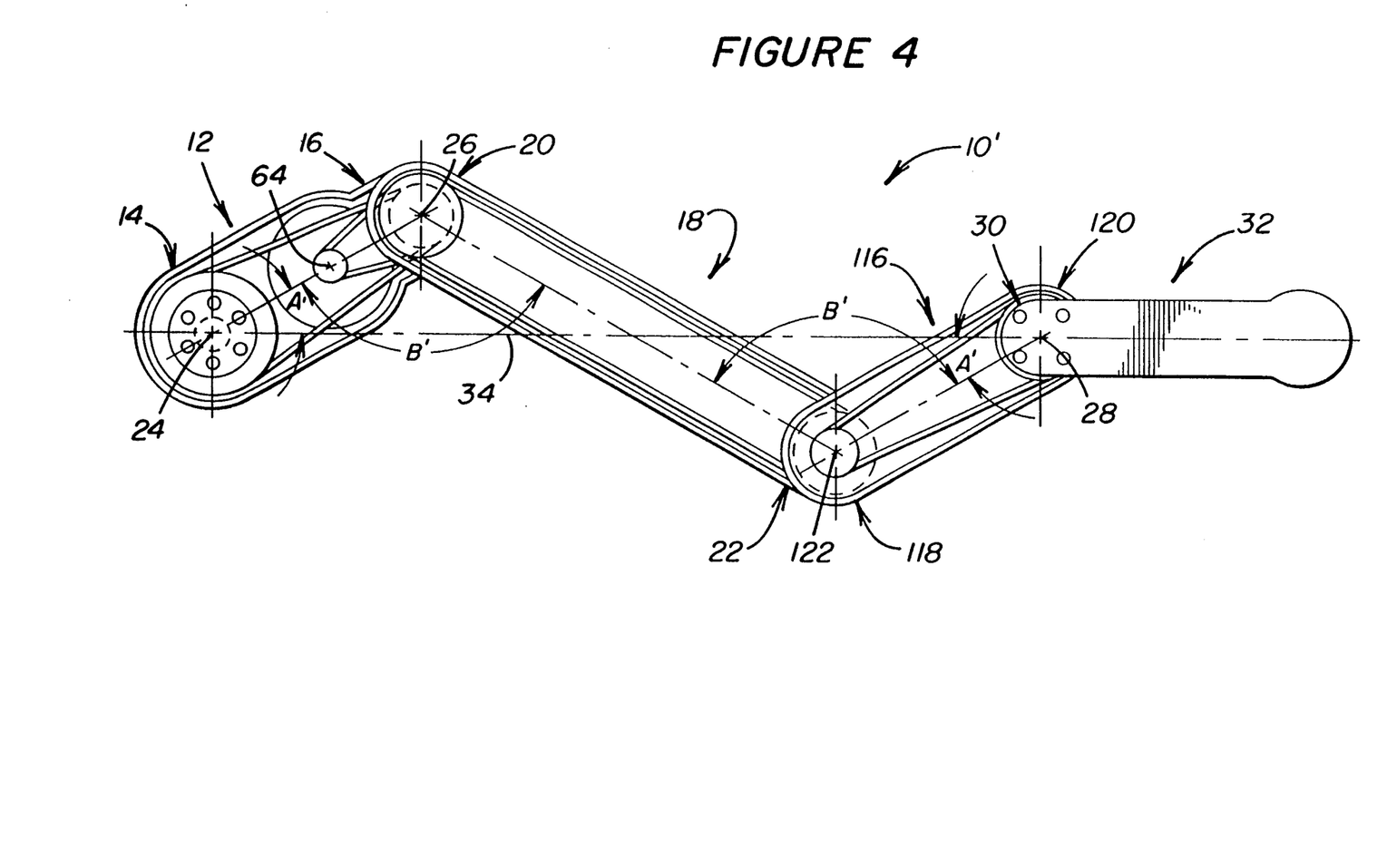
FIG. 4 is a view similar to FIG. 2 but of the embodiment of FIG. 3.

By requiring the circumferential extensions of the various cylindrical surfaces and pulley surfaces to be as just set forth, and by having the lengths of the links be as required above, it is assured that the angles A' each change one-half the amount that each of the angles B' change, whereby the third pivot axis 28 travels along the straight line 34 which passes through and is perpendicular to the first pivot axis 24 and to the third pivot axis 28 and the end effector 32 is at a selected angle from the straight line 34. Basically, the rotation rates of the axes are in the ratio, for axes 24 to 26 to 122 to 28, of 1:2:2:1, with the directions of rotation being such as to provide the straight line motion of the third pivot axis 28 along the line 34 as shown in FIG. 4. This link arrangement allows for a maximum extension of the arm structure 10' of FIGS. 3, 3A, 3B and 4 in an environment where lateral extension is limited.

Also in accordance with the present invention, in both the embodiment of FIGS. 1 and 2 and the embodiment of FIGS. 3, 3A, 3B and 4, additional motor means 144 can be present for rotation the relatively static structure 38 whereby both r and $\theta$ motion is possible within a plane. Still further, motor means 146 can be present for moving the relatively static structure 38 along or parallel to the first pivot axis 24 whereby Z motion can be provided. All such motions are generally present in robotic arms such as those used for positioning silicon wafers, hard computer discs and the like.

Figure 5:
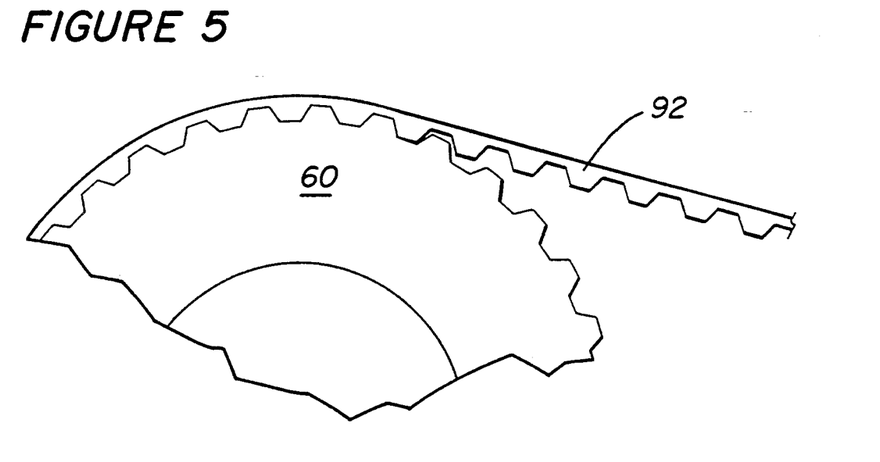
FIG. 5 illustrates a detail of a pulley-belt arrangement useful in accordance with the various embodiments of the present invention.
Figure 6:
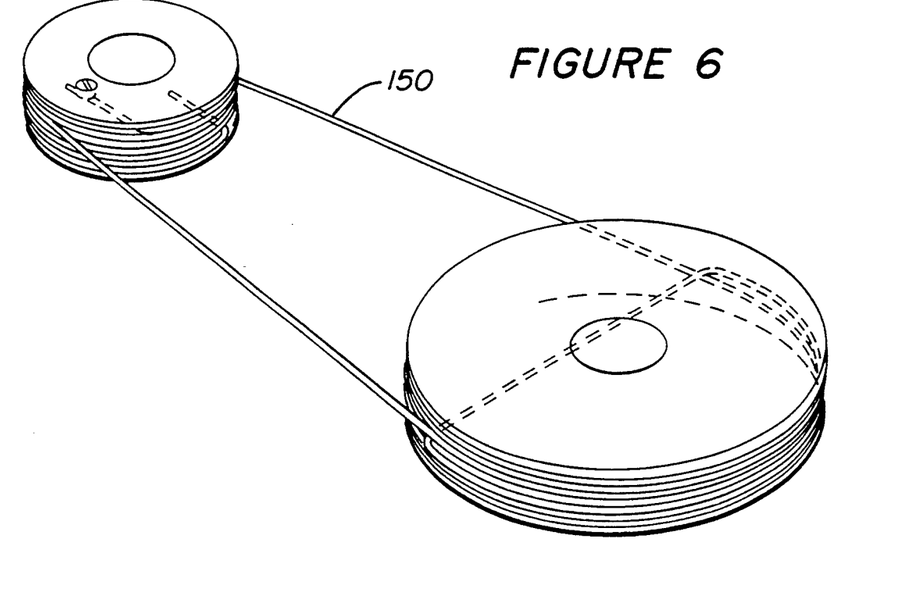
FIG. 6 illustrates an embodiment of a pulley-wire arrangement useful in accordance with the various embodiments of the present invention.

FIG. 5 shows one exemplary embodiment of a pulley surface- or cylindrical surface-belt arrangement which works well in the embodiments of FIGS. 1–4. However, the belt 92 can be replaced by a chain, the cylindrical surfaces and pulley surface can be simply moved by friction, other types of detents rather teeth can be utilized, or the like. FIG. 6 shows an embodiment wherein a wire drive is used instead of a belt type drive. In the particular structure shown each end of a wire 150 is held by a member having a pulley surface or a cylindrical surface on it and the wire 150 passes around, through and then around again, a coacting pulley or cylindrical surface. So that the circumferences will remain the same the wire 150 can fit in opposing helical grooves on the pulley surface and/or cylindrical surface.

Industrial Applicability

The present invention provides embodiments of arm structures 10,10' which are useful for moving semiconductor wafers, computer hard discs, or other articles from one position to another in a radial direction for processing, loading, unloading, and the like. Such arm structures 10,10' are used along with motors which provide $\theta$ and Z movement, as necessary.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An arm structure, comprising:
  a first longitudinally extending link having a proximal end portion and a distal end portion;
  a second longitudinally extending link equal in effective length to said first link, said second link having a proximal end portion and a distal end portion;
  a first housing mounted to said first link intermediate said proximal and distal end portions thereof for rotation about an axis perpendicular to said first link, said first housing having a first pulley surface and a second pulley surface coaxially thereon, said first and second pulley surfaces being longitudinally spaced from one another along said first housing;
  a relatively static structure having a first cylindrical surface having an axis parallel to that of said first housing, said relatively static structure being located at said proximal end portion of said first link, said first link being rotatably mounted to said relatively static structure about an axis of rotation parallel to that of said first housing;
  a drive wheel coaxial with said first cylindrical surface and aligned opposite said first pulley surface;
  a post mounted to said distal end portion of said first link parallel to the axis of said first housing and having a second cylindrical surface thereon having an axis parallel to that of said first housing;
  a second housing rotatably mounted to said post having an axis of rotation parallel to that of said first housing, said second housing having a third pulley surface aligned opposite said first cylindrical surface and a fourth pulley surface aligned opposite said second pulley surface;
  a third housing rotatably mounted to said distal end portion of said second link, having an axis of rotation parallel to that of said first housing and having a fifth pulley surface aligned opposite said second cylindrical surface;
  an end effector attached to said third housing and extending at a selected angle to a line passing through and perpendicular to the axis of said first cylindrical surface and the axis of said third housing;
  first rotating means for applying a rotational force between said drive wheel and said first pulley surface;
  second rotating means for applying a rotational force between said second pulley surface and said fourth pulley surface;
  third rotating means for applying a rotational force between said third pulley surface and said first cylindrical surface, said first cylindrical surface having a circumferential extension twice that of said third pulley surface; and
  fourth rotating means for applying a rotational force between said second cylindrical surface and said fifth pulley surface, said fifth pulley surface having a circumferential extension twice that of said second cylindrical surface.

2. An arm structure as set forth in claim 1, further including:
  rotational drive means for rotating said relatively static structure about said first pivot axis.

3. An arm structure as set forth in claim 2, further including:
  linear drive means for moving said relatively static structure linearly along said first pivot axis.

4. An arm structure as set forth in claim 1, further including:
  linear drive means for moving said relatively static structure linearly along said first pivot axis.

5. An arm structure as set forth in claim 1, wherein said rotating means each comprise belt means.

6. An arm structure, comprising:
  a first longitudinally extending link having a proximal end portion and a distal end portion;
  a second longitudinally extending link twice the effective length of said first link, said second link having a proximal end portion and a distal end portion;
  a third longitudinally extending link equal in effective length to said first link, said third link having a proximal end portion and a distal end portion;
  a first housing mounted to said first link intermediate said proximal and distal end portions thereof for rotation about an axis perpendicular to said first link, said first housing having a first pulley surface and a second pulley surface coaxially thereon, said first and second pulley surfaces being longitudinally spaced from one another along said first housing;
  a relatively static structure having a first cylindrical surface having an axis parallel to that of said first housing, said relatively static structure being located at said proximal end portion of said first link, said first link being rotatably mounted to said relatively static structure for rotation about an axis of rotation parallel to that of said first housing;
  a drive wheel coaxial with said first cylindrical surface and aligned opposite said first pulley surface;
  a first post mounted to said distal end portion of said first link parallel to the axis of said first housing and having a second cylindrical surface thereon having an axis parallel to that of said first housing;
  a second housing rotatably mounted to said first post and having an axis of rotation parallel to that of said first housing, said second housing having a third pulley surface aligned opposite said first cylindrical surface and a fourth pulley surface aligned opposite said second pulley surface;
  a second post mounted to said distal end portion of said second link parallel to the axis of said first housing and having a third cylindrical surface thereon having an axis parallel to that of said first housing;

a third post mounted to said distal end portion of said third link parallel to the axis of said first housing;

a third housing rotatably mounted to said third post and having an axis of rotation parallel to that of said first housing and having a fifth pulley surface aligned opposite said third cylindrical surface;

a fourth housing rotatably mounted to said second post and having an axis of rotation parallel to that of said first housing and having a sixth pulley surface aligned opposite said second cylindrical surface;

an end effector extending from said third housing at a selected angle to a line passing through and perpendicular to the axis of said first cylindrical surface and the axis of said third housing;

first rotating means for applying a rotational force between said drive wheel and said first pulley surface;

second rotating means for applying a rotational force between said second pulley surface and said fourth pulley surface;

third rotating means for applying a rotational force between said third pulley surface and said first cylindrical surface, said first cylindrical surface having a circumferential extension twice that of said third pulley surface;

fourth rotating means for applying a rotational force between said second cylindrical surface and said sixth pulley surface, said second cylindrical surface and said sixth pulley surface having equal circumferential extensions; and fifth rotating means for applying a rotational force between said third cylindrical surface and said fifth pulley surface, said fifth pulley surface having a circumferential extension twice that of said third cylindrical surface.

7. An arm structure as set forth in claim 6, further including:
rotational drive means for rotating said relatively static structure about said first pivot axis.

8. An arm structure as set forth in claim 7, further including:
linear drive means for moving said relatively static structure linearly along said first pivot axis.

9. An arm structure as set forth in claim 6, further including:
linear drive means for moving said relatively static structure linearly along said first pivot axis.

10. An arm structure as set forth in claim 6, wherein said rotating means each comprise belt means.

11. An arm structure, comprising:
a first longitudinally extending link having a proximal end portion and a distal end portion;
a second longitudinally extending link having a proximal end portion and a distal end portion, said second link having twice the effective length of said first link;
a third longitudinally extending link equal in effective length to said first link, said third link having a proximal end portion and a distal end portion;
an end effector;
a relatively static structure located at said proximal end portion of said first link;
first pivot means for mounting said proximal end portion of said first link to said relatively static structure for rotation about a first pivot axis;

second pivot means for mounting said proximal end portion of said second link to said distal end portion of said first link for rotation about a second pivot axis parallel to said first pivot axis;

third pivot means for mounting said end effector to said distal end portion of said third link for rotation about a third pivot axis parallel to said first pivot axis;

fourth pivot means for mounting said proximal end portion of said third link to said distal end portion of said second link for rotation about a fourth axis parallel to said first pivot axis; and drive means for coordinately pivoting said first link about said first pivot axis, said second link about said second pivot axis, said third link about said fourth pivot axis and said end effector about said third pivot axis at relative rotation ratios of 1:2:2:1 such that said third axis moves linearly along a line passing through and perpendicular to said first pivot axis and to said third pivot axis and said end effector is maintained at a selected angle to said line.

12. An arm structure as set forth in claim 11, further including:
rotational drive means for rotating said relatively static structure about said first pivot axis.

13. An arm structure as set forth in claim 12, further including:
linear drive means for moving said relatively static structure linearly along said first pivot axis.

14. An arm structure as set forth in claim 11, further including:
linear drive means for moving said relatively static structure linearly along said first pivot axis.

15. An arm structure as set forth in claim 11, wherein said rotating means each comprise belt means.

16. An arm structure as set forth in claim 11, wherein said rotating means each comprise wire means.

17. An arm structure, comprising:
a first longitudinally extending link having a proximal end portion and a distal end portion;
a second longitudinally extending link having a proximal end portion and a distal end portion, said second link having an equal effective length as said first link;
an end effector;
a relatively static structure located at said proximal end portion of said first link;
static first pivot link for mounting said proximal end portion of said first link to said relatively static structure for free rotation about a first pivot axis;
second pivot means for mounting said proximal end portion of said second link to said distal end portion of said first link for rotation about a second pivot axis parallel to said first pivot axis;
third pivot means for mounting said end effector to said distal end portion of said second link for rotation about a third pivot axis parallel to said first pivot axis;
motor means;
a drive wheel coaxial with said first pivot axis and driven by said motor means, said drive wheel being free from connection with said first pivot means; and
first pivot axis rotating means for applying a rotational force from said second pivot axis to said first pivot axis to rotate said first link about said first pivot axis; and second pivot axis rotating means for applying a rotational force from said drive wheel to said second pivot axis to rotate said links about said second pivot axis;

third pivot axis rotating means for applying a rotational force from said second pivot axis to said third pivot axis to rotate said end effector about said third pivot axis;

wherein said rotating means includes coordinating means for coordinating the pivoting of said first link about said first pivot axis, said second link about said second pivot axis at relative rotation ratios of 1:2:1 such that said third axis moves linearly along a line passing through and perpendicular to said first pivot axis and to said third pivot axis and said end effector is maintained at a selected angle to said line.

18. An arm structure as set forth in claim 17, wherein said second pivot axis rotating means includes reduction means for reducing the rotation of said second pivot axis from that of said drive wheel.

19. An arm structure as set forth in claim 17, further including:
rotational drive means for rotating said relatively static structure about said first pivot axis.

20. An arm structure as set forth in claim 19, further including:
linear drive means for moving said relatively static structure linearly along said first pivot axis.

21. An arm structure as set forth in claim 17, further including:
linear drive means for moving said relatively static structure linearly along said first pivot axis.

22. An arm structure as set forth in claim 17, wherein said rotating means each comprise belt means.

23. An arm structure as set forth in claim 17, wherein said rotating means each comprise wire means.

24. An arm structure, comprising:
a first longitudinally extending link having a proximal end portion and a distal end portion;
a second longitudinally extending link having a proximal end portion and a distal end portion, said second link having twice the effective length of said first link;
a third longitudinally extending link equal in effective length to said first link, said third link having a proximal end portion and a distal end portion;
an end effector;
a relatively static structure located at said proximal end portion of said first link;
first pivot means for mounting said proximal end portion of said first link to said relatively static structure for rotation about a first pivot axis;
second pivot means for mounting said proximal end portion of said second link to said distal end portion of said first link for rotation about a second pivot axis parallel to said first pivot axis;
third pivot means for mounting said end effector to said distal end portion of said third link for rotation about a third pivot axis parallel to said first pivot axis;
fourth pivot means for mounting said proximal end portion of said third link to said distal end portion of said second link for rotation about a fourth axis parallel to said first pivot axis;
drive means for applying a rotational force to rotate said first and second links about said second pivot axis;
first pivot axis rotating means for applying a rotational force from said second pivot axis to said first pivot axis to rotate said first link about said first pivot axis;
fourth pivot axis rotating means for applying a rotational force from said second pivot axis to said fourth pivot axis to rotate said second and third links about said fourth pivot axis; and
third pivot axis rotating means for applying a rotational force from said fourth pivot axis to said third pivot axis to rotate said end effector about said third pivot axis;
wherein said rotating means includes coordinating means for coordinating the pivoting of said first link about said first pivot axis, said second link about said second pivot axis, said third link about said fourth pivot axis and said end effector about said third pivot axis at relative rotation ratios of 1:2:2:1 such that said third axis moves linearly along a line passing through and perpendicular to said first pivot axis and to said third pivot axis and said end effector is maintained at a selected angle to said line.

25. An arm structure as set forth in claim 23, wherein said drive means comprises:
a drive wheel coaxial with said first pivot axis;
second pivot axis rotating means for applying a rotational force from said drive wheel for rotating said first and second links about said second pivot axis.

26. An arm structure as set forth in claim 25, wherein said second pivot axis rotating means includes reduction means for reducing the rotation of said second pivot axis from that of said drive wheel.

27. An arm structure as set forth in claim 24, further including:
rotational drive means for rotating said relatively static structure about said first pivot axis.

28. An arm structure as set forth in claim 27, further including:
linear drive means for moving said relatively static structure linearly along said first pivot axis.

29. An arm structure as set forth in claim 24, further including:
linear drive means for moving said relatively static structure linearly along said first pivot axis.

30. An arm structure as set forth in claim 24, wherein said rotating means each comprise belt means.

31. An arm structure as set forth in claim 24, wherein said rotating means each comprise wire means.

32. An arm structure as set forth in claim 18, wherein said reduction means is located and supported by said first longitudinally extending link between said first pivot axis and said second pivot axis.

* * * * *